(12) United States Patent
Sheppard

(10) Patent No.: US 9,943,030 B2
(45) Date of Patent: Apr. 17, 2018

(54) WALKING BEAM FURROW CLOSING SYSTEM FOR DISC SEEDER

(71) Applicant: Morris Industries Ltd., Saskatoon (CA)

(72) Inventor: Clint W. Sheppard, Yorkton (CA)

(73) Assignee: Morris Industries, Ltd., Saskatoon (CA)

( * ) Notice: Subject to any disclaimer, the term of this patent is extended or adjusted under 35 U.S.C. 154(b) by 31 days.

(21) Appl. No.: 15/271,797

(22) Filed: Sep. 21, 2016

(65) Prior Publication Data

US 2017/0079193 A1   Mar. 23, 2017

Related U.S. Application Data

(60) Provisional application No. 62/222,644, filed on Sep. 23, 2015.

(51) Int. Cl.
*A01C 7/20* (2006.01)
*A01C 5/06* (2006.01)

(52) U.S. Cl.
CPC ............. *A01C 7/205* (2013.01); *A01C 5/064* (2013.01); *A01C 5/066* (2013.01); *A01C 5/068* (2013.01)

(58) Field of Classification Search
CPC ......... A01C 7/201; A01C 7/203; A01C 7/205; A01C 5/06; A01C 5/064; A01C 5/066; A01C 5/068
See application file for complete search history.

(56) References Cited

U.S. PATENT DOCUMENTS

| | | | |
|---|---|---|---|
| 4,519,325 A * | 5/1985 | Miller | A01C 5/06 111/164 |
| 5,398,625 A * | 3/1995 | Johnson | A01C 5/068 111/164 |
| 5,957,217 A * | 9/1999 | Gunnink | A01B 35/16 172/166 |
| 6,659,193 B1 | 12/2003 | Best et al. | |
| 6,698,528 B2 | 3/2004 | Best et al. | |
| 7,617,782 B2 | 11/2009 | Sheppard et al. | |
| 2005/0155536 A1* | 7/2005 | Wendte | A01C 5/068 111/200 |
| 2008/0093093 A1 | 4/2008 | Sheppard et al. | |
| 2009/0056962 A1* | 3/2009 | Martin | A01C 5/064 172/551 |
| 2009/0158981 A1* | 6/2009 | Jagow | A01C 7/203 111/163 |
| 2010/0096149 A1* | 4/2010 | Friggstad | A01C 5/064 172/574 |
| 2015/0144039 A1 | 5/2015 | Benko et al. | |
| 2015/0144042 A1 | 5/2015 | Sheppard et al. | |

OTHER PUBLICATIONS

Beyond Agronomy, The Spark (Mar. 6, 2012) at http://beyondagronomy.com/newsletterarchive/march-6-2012.

* cited by examiner

*Primary Examiner* — Alicia Torres

(74) *Attorney, Agent, or Firm* — Hovey Williams LLP

(57) ABSTRACT

An agricultural disc opener is operable to be advanced in a forward direction along the ground to plant seed. The disc opener includes a suspension, a disc blade, a seed firming wheel, and a closing wheel. The suspension includes an elongated closer/firmer walking beam pivotally mounted relative to the suspension for pivoting about a lateral beam pivot axis. The wheels are rotatably mounted on the walking beam on opposite forward and aft sides of the beam pivot axis, with the walking beam configured to pivot as the wheels travel over the ground.

20 Claims, 10 Drawing Sheets

WALKING BEAM FURROW CLOSING SYSTEM FOR DISC SEEDER

RELATED APPLICATION

This application claims the benefit of U.S. Provisional Application Ser. No. 62/222,644, filed Sep. 23, 2015, entitled WALKING BEAM FURROW CLOSING SYSTEM FOR DISC SEEDER, which is hereby incorporated in its entirety by reference herein.

BACKGROUND

1. Field

The present invention relates generally to agricultural implements. More specifically, embodiments of the present invention concern an agricultural disc opener including a suspension with a walking beam that supports firming and closing wheels.

2. Discussion of Prior Art

Agricultural planters and seeders have long been used to deposit seeds in a furrow. Conventional disc seeders use a disc opener that includes a rotating disc blade to open the furrow. The opener also includes a closing system to cover the furrow with soil.

In one known disc opener, the closing system has a packer tire arrangement mounted on an arm to both close the furrow with soil and pack the soil over the seed deposited in the furrow.

In another known disc opener, the closing system has a firming wheel to press seed into the bottom of the furrow and a closing wheel to move soil into the furrow and cover the seed with the soil. Typically, the disc opener also includes a spring-loaded firming wheel arm to apply downward pressure to the firming wheel and a closing wheel arm to apply downward pressure to the closing wheel.

However, the prior art disc openers have various deficiencies. For instance, the known packer tire system that both closes the furrow and packs soil over the furrow has been found to pack soil too firmly within the furrow. Over-packing of the soil above the seed has been found to restrict plant emergence, particularly in clay soils.

The disc opener with separate firming and closing arms permits the adjustment of downward pressure. However, this known disc opener has a complex and expensive construction. Furthermore, the process of setting the pressure adjustments for the firming and closing arms is a trial-and-error process that is complicated and time-consuming. Yet further, the spring-loaded firming arm is known to allow the firming wheel to bounce or chatter, which causes inconsistent seed placement.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural disc opener that does not suffer from the problems and limitations of the prior art disc openers set forth above.

One aspect of the present invention concerns an agricultural disc opener operable to be advanced in a forward direction along the ground to plant seed. The agricultural disc opener broadly includes a vertically adjustable suspension, a disc blade, a seed firming wheel, and a closing wheel. The disc blade is operably supported by the suspension to open an elongated furrow in the ground as the disc opener is advanced in the forward direction, with seed being deposited into the open furrow. The seed firming wheel is located rearwardly of the disc blade and is configured to press the seed downwardly into the furrow. The closing wheel is located rearwardly of the seed firming wheel and is configured to deposit soil into the furrow to at least partly cover the seed. The suspension further includes an elongated closer/firmer walking beam pivotally mounted relative to the suspension for pivoting about a lateral beam pivot axis. The wheels are rotatably mounted on the walking beam on opposite forward and aft sides of the beam pivot axis, with the walking beam configured to pivot as the wheels travel over the ground.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 3:
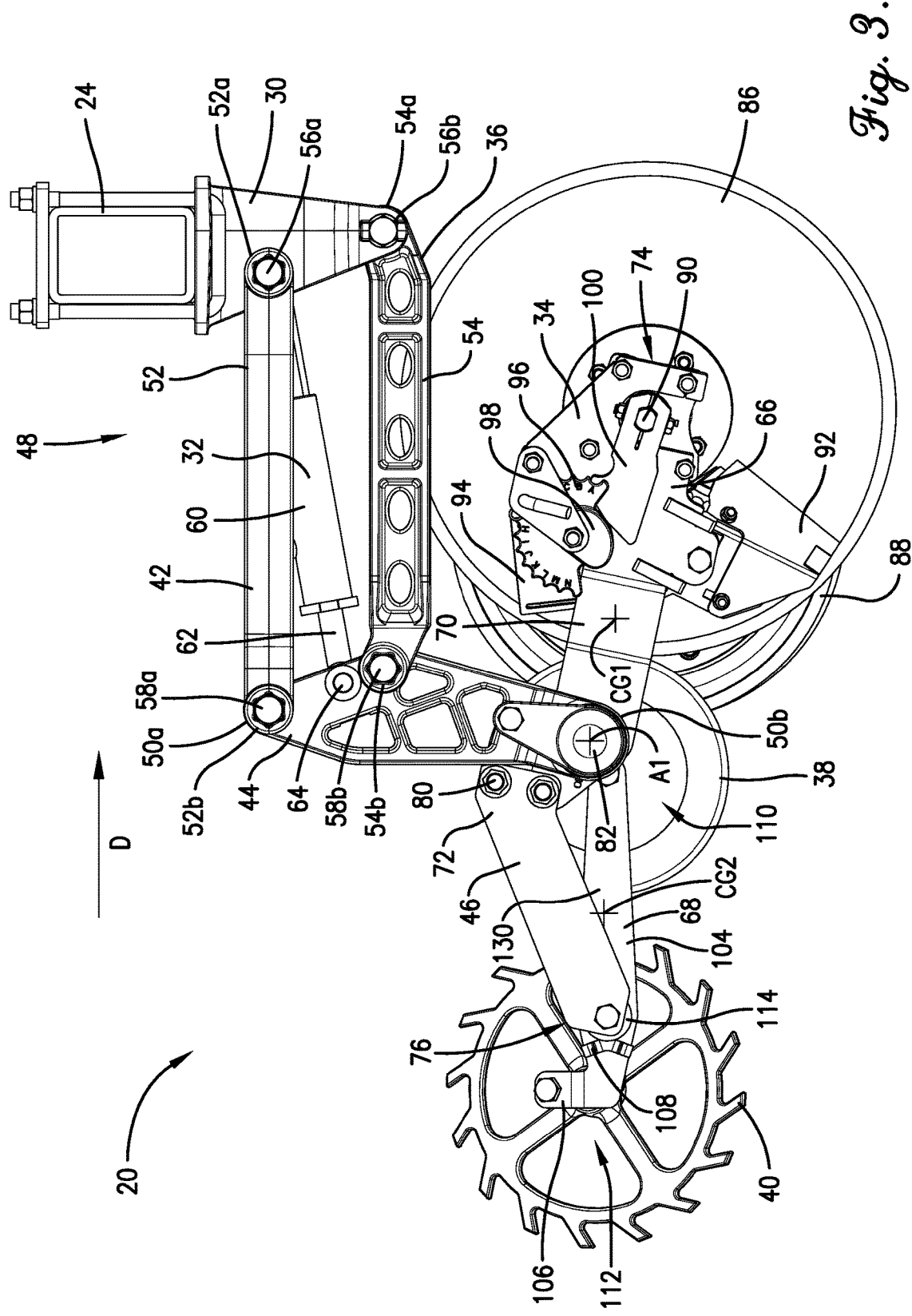
FIG. 3 is a side elevation of the disc opener specifically shown in FIG. 1, showing the disc opener in a raised transport position where the disc opener is spaced entirely above the ground, with the suspension including a linkage, suspension arm, and walking beam assembly, and with the actuator being retracted to shift the suspension upwardly.
Figure 4:
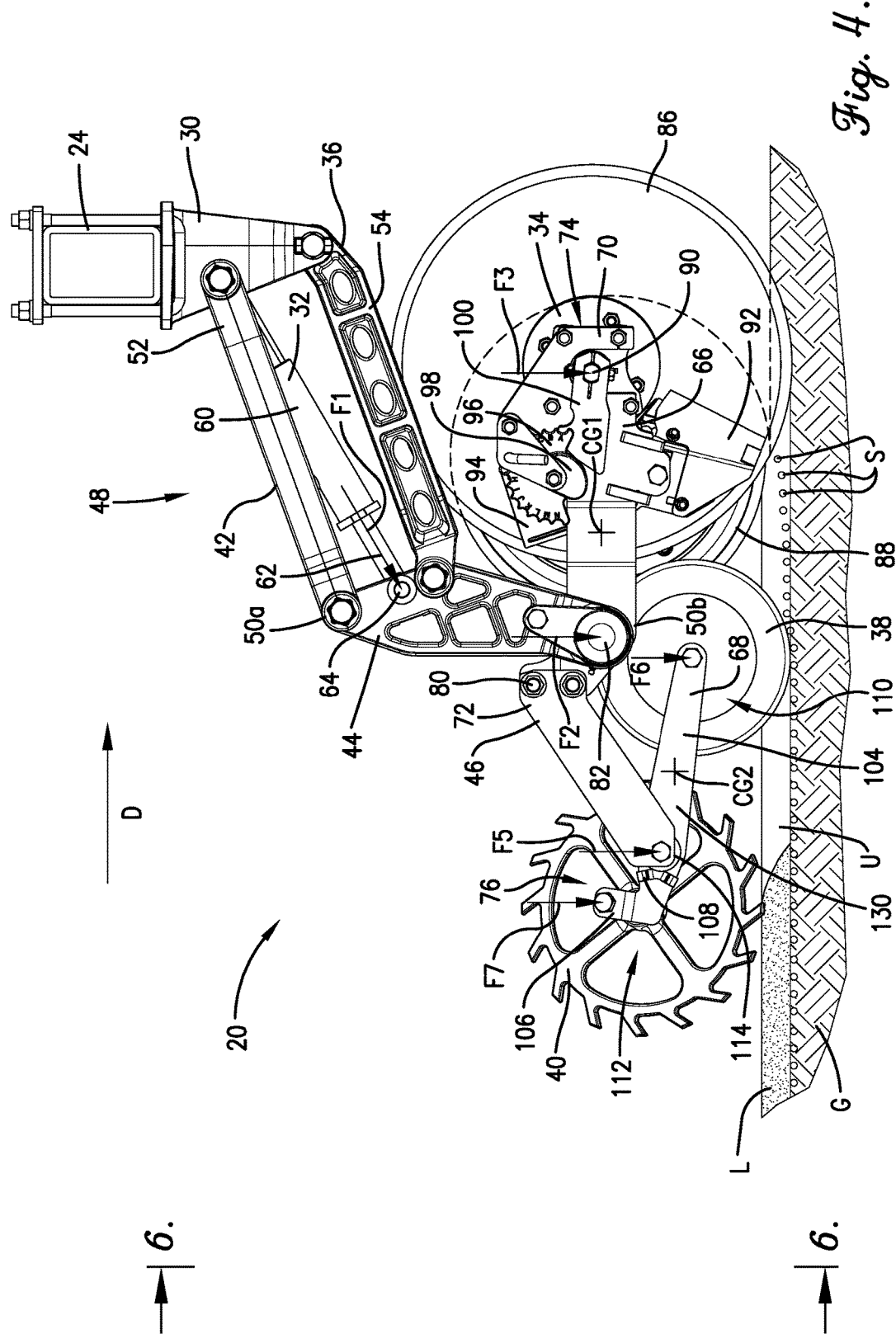
Figure 5:
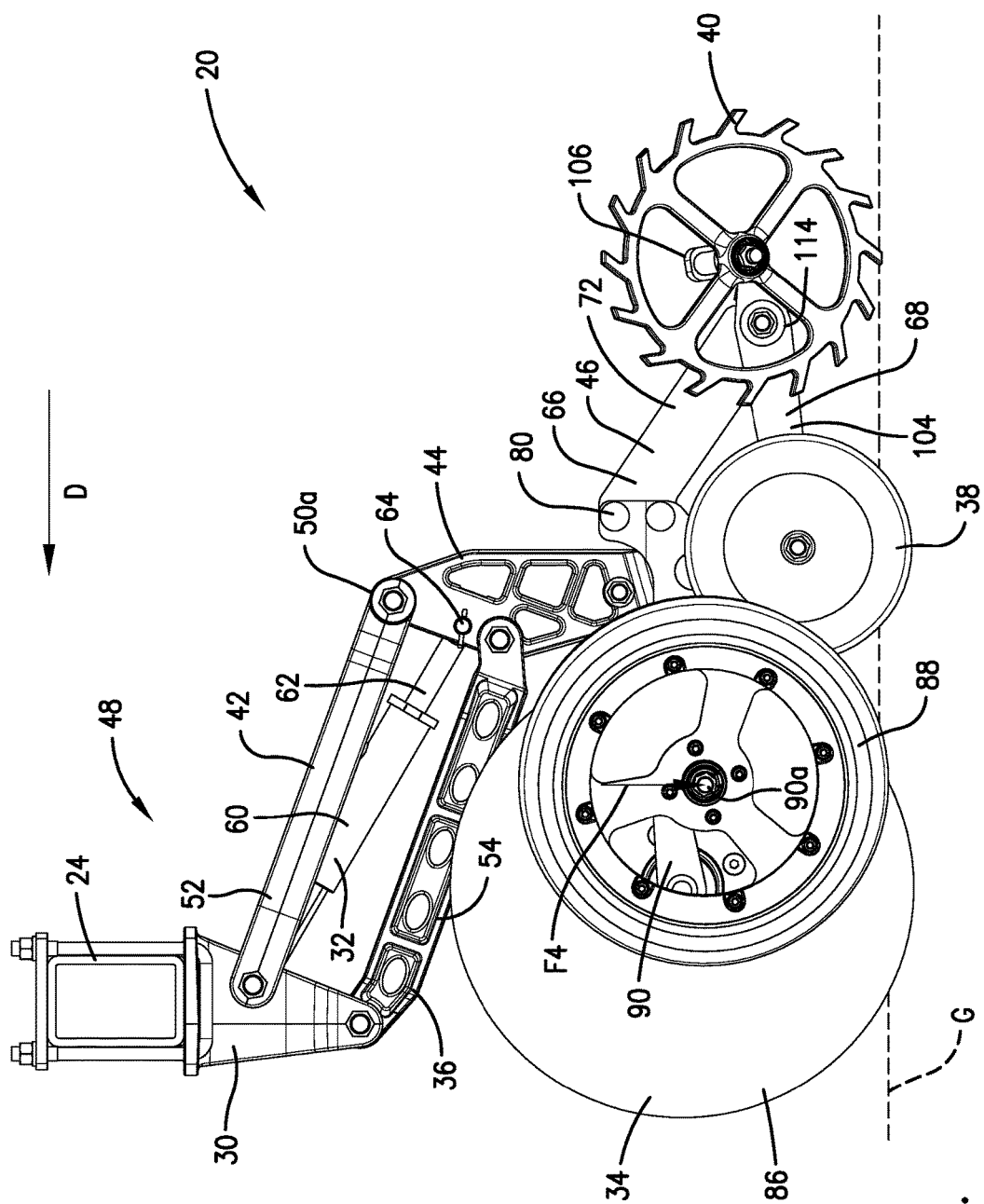
Figure 6:
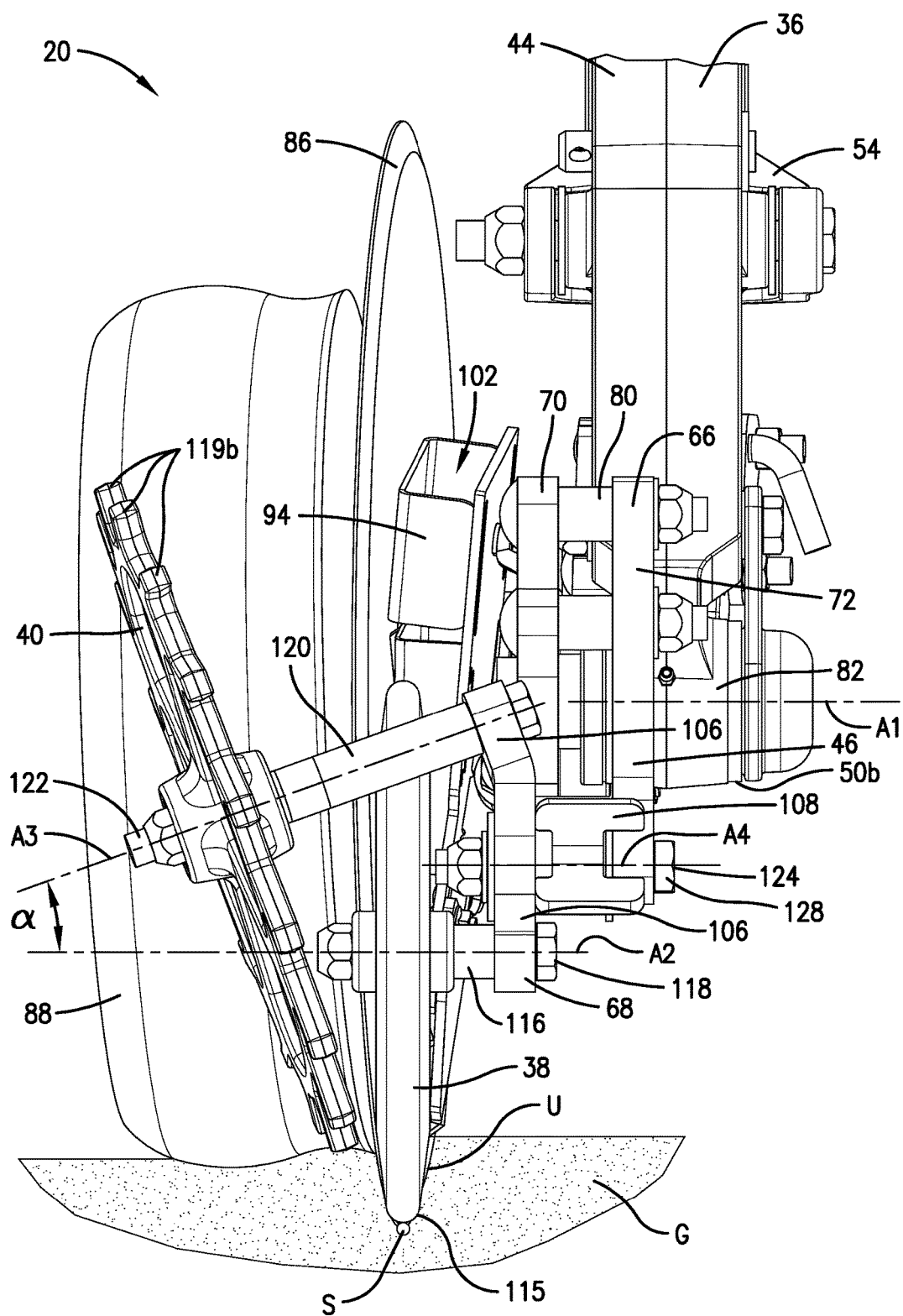
Figure 7:
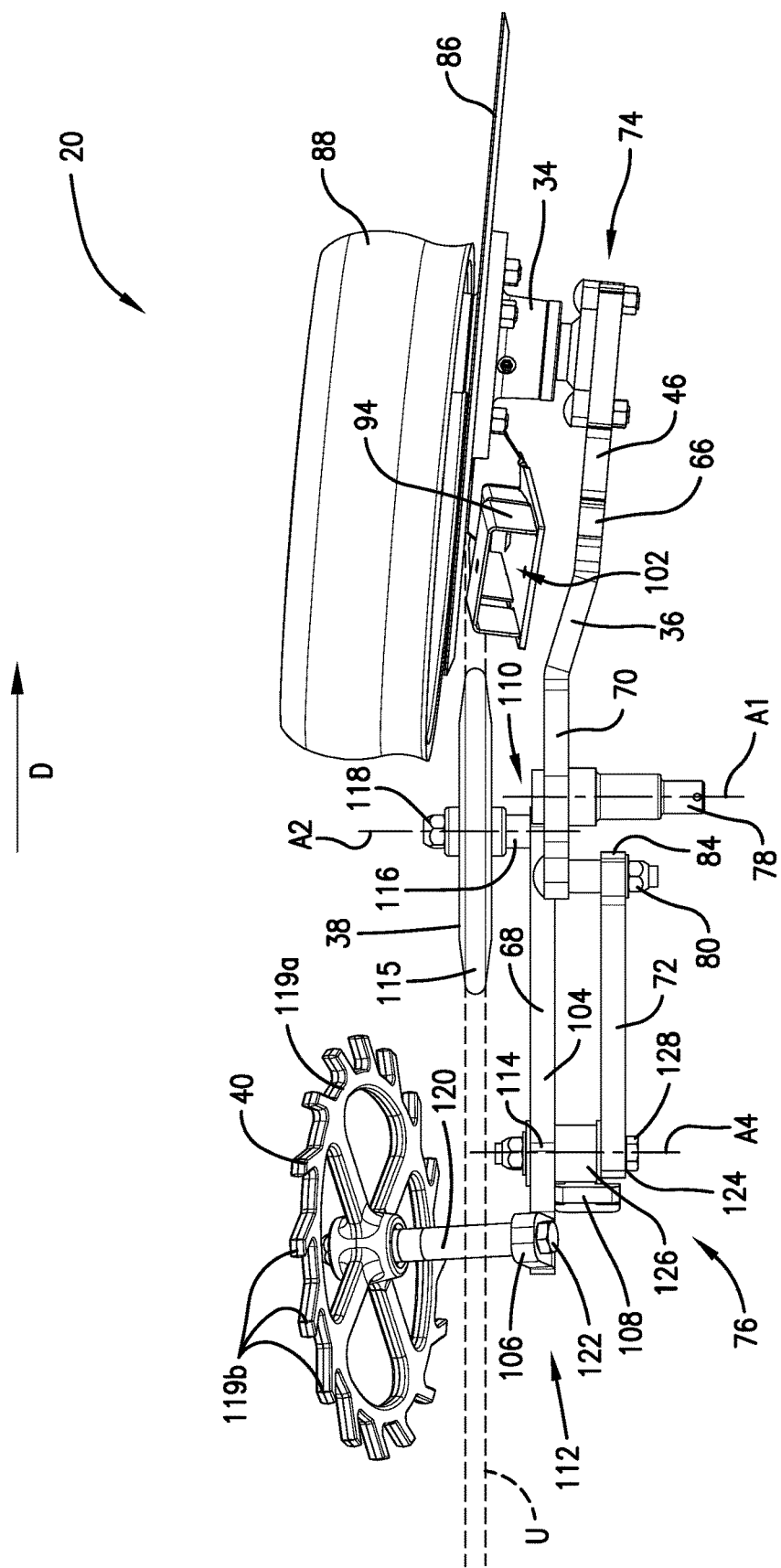
Figure 8:
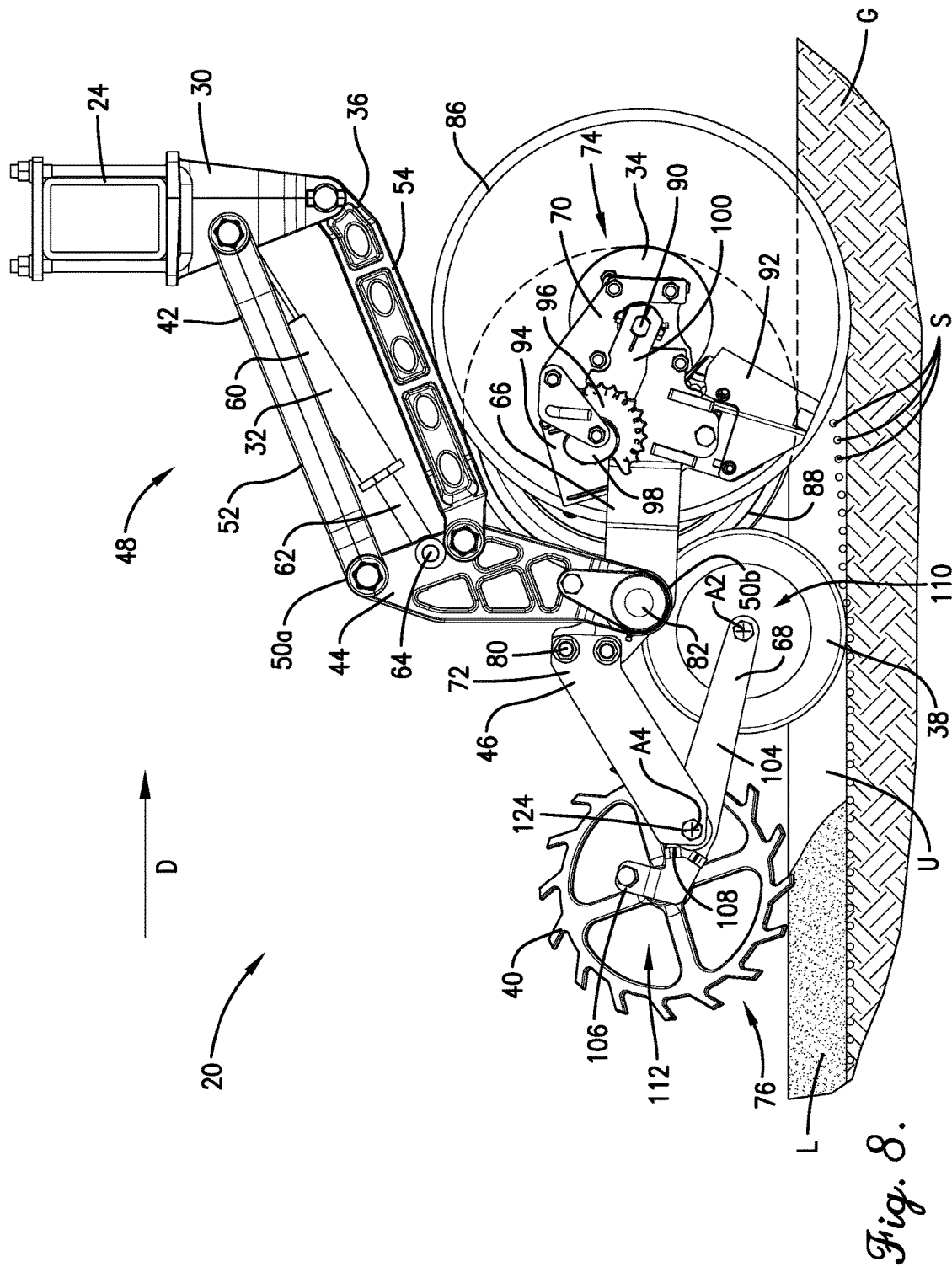
Figure 9:
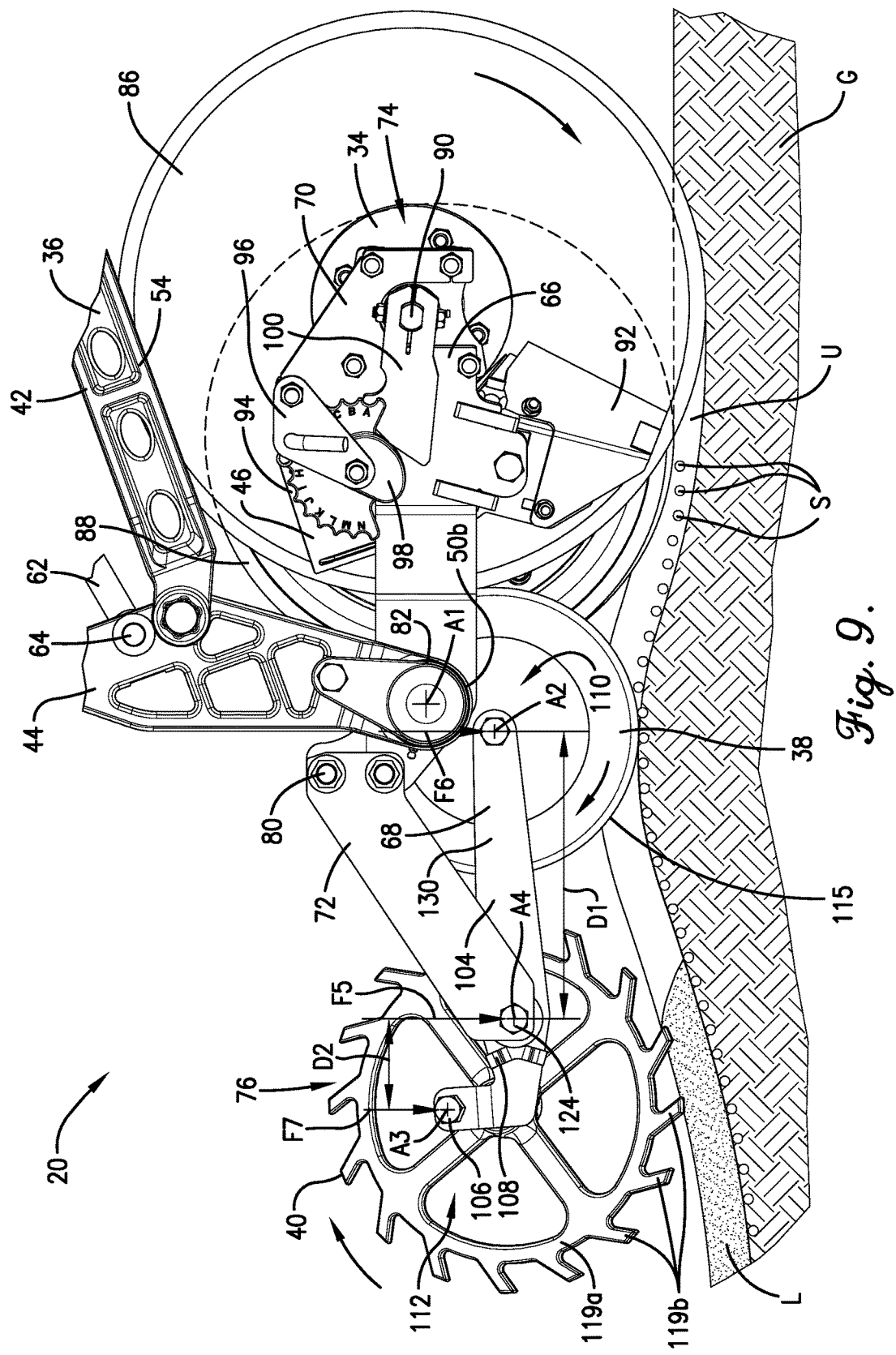
Figure 10:
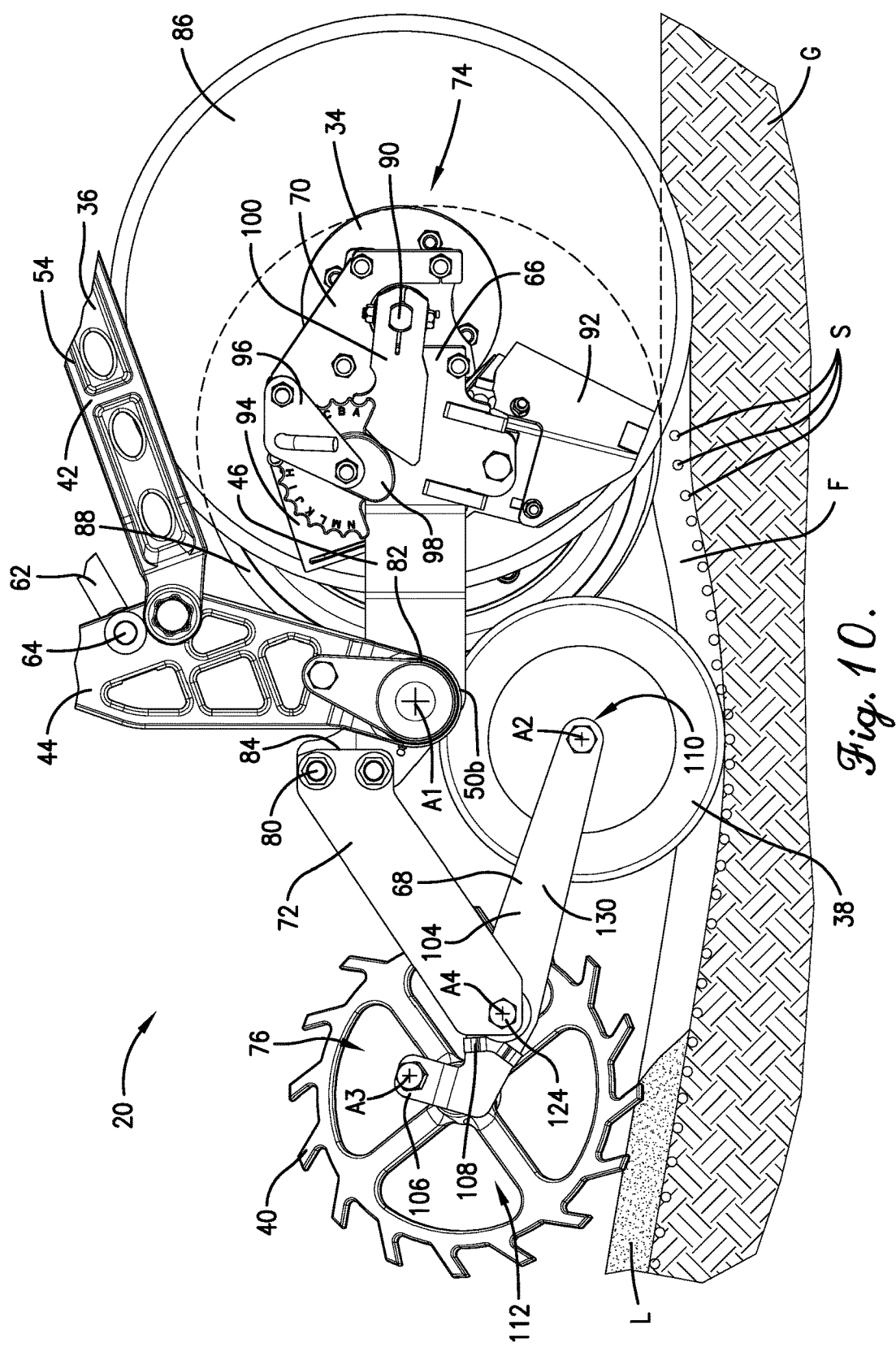

FIG. 4 is a side elevation of the disc opener similar to FIG. 3, but showing the disc opener in a lowered operating position and being advanced to form a furrow, to deposit seed into the furrow, and to cover the furrow with fill soil, with a firmer/closer walking beam of the walking beam assembly supporting the firming and closing wheels, and with a disc walking beam of the walking beam assembly supporting the furrow opening assembly and the firmer/closer walking beam;

FIG. 5 is a side elevation of the disc opener shown in FIG. 4, but taken from the opposite side, showing a gauge wheel located adjacent a disc blade of the furrow opening assembly;

FIG. 6 is an enlarged, fragmentary, rear elevation of the disc opener taken along line 6-6 in FIG. 4, showing the firming wheel extending into the furrow to press the seed into the furrow and the closing wheel alongside the furrow;

FIG. 7 is a fragmentary top view of the disc opener shown in FIGS. 2-6, showing the walking beams pivotally connected and positioned alongside one another;

FIG. 8 is a side elevation of the disc opener similar to FIG. 4, but showing the gauge wheel set so that the furrow depth is greater than the furrow depth shown in FIG. 4, with the walking beams being shifted so that the firming wheel engages the bottom of the furrow and the closing wheel engages the ground;

FIG. 9 is an enlarged, fragmentary side elevation similar to FIG. 4, but showing the firming and closing wheels being advanced up an inclined section of the ground; and FIG. 10 is an enlarged, fragmentary side elevation similar to FIG. 9, but showing the firming and closing wheels being advanced down a declined section of the ground.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-4, an agricultural disc opener 20 is configured to be advanced in a forward direction D along the ground G. As normally done, the disc opener 20 is advanced by being towed behind an agricultural vehicle (not shown). As will be discussed, the disc opener 20 is operable to open a furrow U, deposit seed S within the furrow U, and then fill the furrow U with loose fill soil L to cover the seed S (see FIG. 4).

Figure 1:
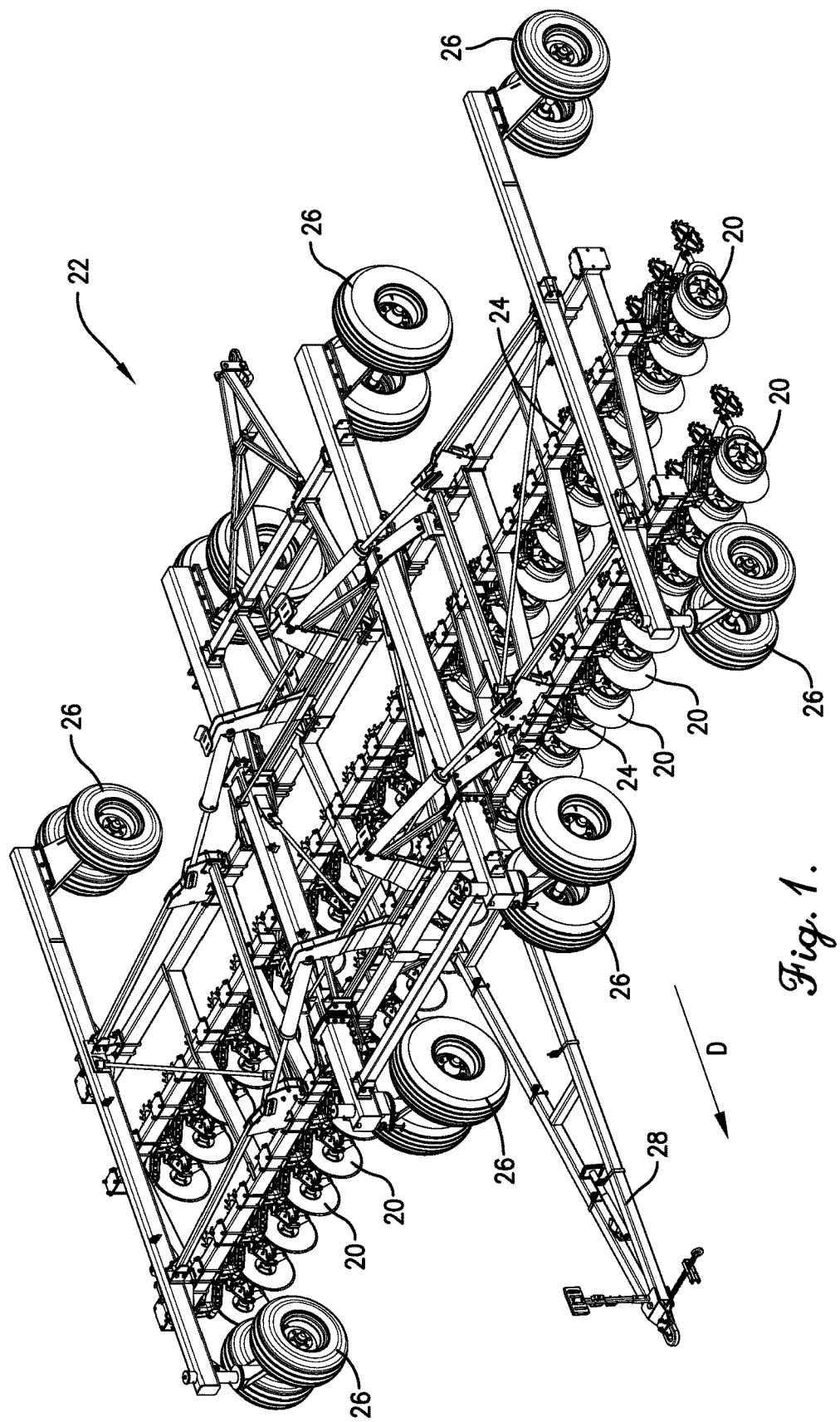
FIG. 1 is a perspective of a disc seeder constructed in accordance with a preferred embodiment of the present invention, with the disc seeder including a frame and multiple disc openers mounted on the frame.

Multiple disc openers 20 are preferably provided as part of an implement 22 (see FIG. 1). The implement 22 preferably includes a frame with toolbars 24, wheels 26 rotatably mounted on the frame, and a hitch 28. The implement 22 also includes a hydraulic system (not shown) to shift the disc openers 20 vertically. The hydraulic system preferably includes hydraulic lines (not shown) that deliver hydraulic fluid to the disc openers and accumulators (not shown) to maintain hydraulic pressure within the lines.

The illustrated implement 22 is configured for use as a disc seeder and is operable to be used with an air cart (not shown) to receive seed S from the air cart. However, certain aspects of the present invention are applicable where the disc openers 20 are used as part of an alternative implement, such as a planter.

Each disc opener 20 of the present invention is configured to plant seed S in the furrow U while being advanced. The disc opener 20 preferably includes a mounting bracket 30, an actuator 32, a furrow opening assembly 34, a vertically adjustable suspension 36, a firming wheel 38, and a closing wheel 40.

Turning to FIGS. 2-5, the suspension 36 is configured to shift the furrow opening assembly 34 and wheels 38,40 vertically to move the disc opener 20 between a raised transport position (see FIG. 3) and a lowered operating position (see FIG. 4). As will be discussed, the actuator 32 is operably connected to the suspension 36 to move the suspension 36 between the positions.

In the raised transport position, the disc opener 20 is spaced entirely above the ground G so that the implement 22 can be transported on a road or highway (not shown) without damaging the disc opener 20. It will be appreciated that the illustrated transport position is one of several raised positions that are suitable for transporting the disc opener 20. For instance, the actuator 32 could be retracted while in the transport position to further raise the disc opener 20.

In the lowered operating position, the suspension 36 is configured to apply downward pressure to the furrow opening assembly 34 and the wheels 38,40. As will be discussed, the actuator 32 urges the furrow opening assembly 34 and wheels 38,40 into engagement with the ground G in the operating position.

It will be appreciated that the operating position illustrated in FIG. 4 is one of several operating positions where the disc opener 20 can engage the ground G to plant seed S. For instance, the actuator 32 could be extended while in the operating position shown in FIG. 4 to further lower the disc opener 20 into another operating position (such as that shown in FIG. 8).

The suspension 36 preferably includes a linkage 42, a suspension arm 44, and a walking beam assembly 46. The mounting bracket 30 preferably supports the suspension 36 in a location generally below the toolbar 24. The mounting bracket 30 includes U-bolt fasteners to adjustably mount the suspension 36 on the toolbar 24. In particular, the mounting bracket 30 can be loosened or detached from the toolbar 24 to move the disc opener 20 to another location on the toolbar 24 (or to a location on another toolbar 24).

The illustrated linkage 42 and suspension arm 44 are supported by the mounting bracket 30. The linkage 42, suspension arm 44, and mounting bracket 30 cooperatively form a parallel, four-bar linkage assembly 48. The suspension arm 44 preferably comprises a unitary weldment and presents an upper arm end 50a and a lower arm end 50b.

The linkage 42 preferably includes upper and lower links 52,54. The upper link 52 presents opposite link ends 52a,b, while lower link presents opposite link ends 54a,b (see FIG. 3). The illustrated link ends 52a,54a are pivotally attached to the mounting bracket 30 at upper and lower bracket pivot joints 56a,b (see FIG. 3). Similarly, the illustrated link ends 52b,54b are pivotally attached to the suspension arm 44 at upper and lower arm pivot joints 58a,b adjacent the upper arm end 50a (see FIG. 3).

The configuration of the parallel four-bar linkage assembly 48 permits the suspension arm 44 to move along a vertical path, relative to the toolbar 24, while remaining in an upright orientation. At the same time, the mounting bracket 30, linkage 42, and suspension arm 44 restrict the suspension arm 44 from rotating relative to the toolbar 24.

While the illustrated four-bar linkage assembly 48 is preferred to support other components of the disc opener 20 in the transport and operating positions, the disc opener 20 could have an alternative support structure. For instance, the suspension 36 could have an alternative linkage to interconnect the bracket 30 and the suspension arm 44 and permit vertical shifting movement of the suspension arm 44. It will also be appreciated that the suspension arm 44 could be alternatively configured or wholly eliminated without departing from certain aspects of the present invention.

As will be discussed, the linkage assembly 48 preferably supports both the furrow opening assembly 34 and the wheels 38,40. However, for some aspects of the present invention, the disc opener 20 could have multiple linkages that move independently of one another. For instance, the furrow opening assembly 34 could be supported by a first linkage while the wheels 38,40 are supported by a second linkage that is shiftable independently of the first linkage.

The actuator 32 preferably comprises a conventional hydraulic cylinder with a cylinder body 60 and a piston 62 (see FIG. 3). As is customary, the piston 62 is slidable inwardly relative to the body 60 to retract the actuator 32 and is slidable outwardly relative to the body 60 to extend the actuator 32. The actuator 32 is fluidly connected to the hydraulic system of the implement 22 via hydraulic lines (not shown). Thus, the actuator 32 fluidly communicates with the hydraulic system so that the actuator 32 can be selectively extended and retracted.

The actuator 32 is preferably mounted to drive the linkage assembly 48 between the transport and operating positions. The actuator 32 is mounted by pivotally attaching the body 60 to the mounting bracket 30 at the upper bracket pivot joint 56a and by pivotally attaching the piston 62 to the suspension arm 44 at a piston pivot joint 64 between the upper and lower arm pivot joints 56a,b. Of course, the orientation of this attachment may be reversed if desired.

In the usual manner, the actuator 32 is shiftable between a retracted position associated with the transport position (see FIG. 3) and an extended position associated with the operating position (see FIG. 4).

As the actuator 32 extends, the actuator 32 causes the suspension arm 44 to shift downwardly toward the ground G. Conversely, as the actuator 32 retracts, the actuator 32 causes the suspension arm 44 to shift upwardly away from the ground G. The actuator 32 applies force to the suspension arm 44, with the suspension arm 44 applying a corresponding force to the walking beam assembly 46. For instance, in the operating position, the actuator 32 applies a generally downward actuator force F1 to the suspension arm 44 (see FIG. 4). In turn, the arm 44 applies a corresponding downward arm force F2 to the walking beam assembly 46 (see FIG. 4).

Although the actuator 32 preferably comprises a hydraulic cylinder, the actuator 32 could include an alternative drive (such as a rotary hydraulic motor, a pneumatic cylinder, an electric motor, etc.) to shift the disc opener 20.

Turning to FIGS. 2-7, the walking beam assembly 46 is preferably configured to distribute a force applied by the suspension arm 44 (such as the downward arm force F2 associated with the operating position) among the furrow opening assembly 34 and the wheels 38,40. The distribution of force among these components by the walking beam assembly 46 provides various advantages. For instance, as will be described, the configuration of the walking beam assembly 46 has been found to restrict overpacking of fill soil L above the seed S. It has also been found that the walking beam assembly 46 also restricts the firming wheel 38 from experiencing bounce or chatter while traveling in the furrow U.

Figure 2:
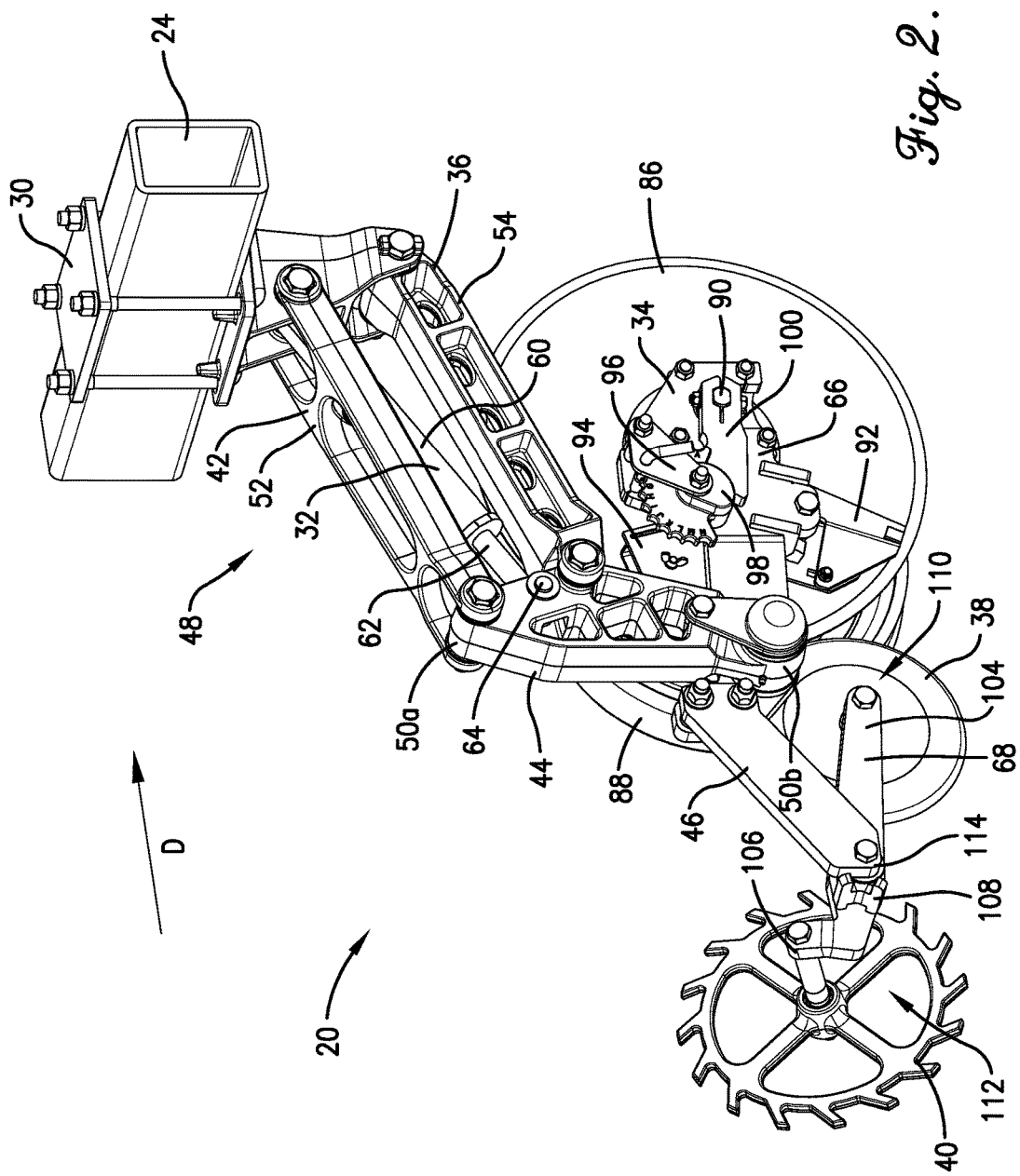
FIG. 2 is a perspective of one of the disc openers shown in FIG. 1, showing a mounting bracket, actuator, furrow opening assembly, suspension, firming wheel, and closing wheel of the disc opener.

The walking beam assembly 46 preferably includes an elongated disc walking beam 66 and a firmer/closer walking beam 68 (see FIG. 2). The disc walking beam 66 is configured to support the furrow opening assembly 34 and the firmer/closer walking beam 68. The illustrated disc walking beam 66 includes front and rear beam sections 70,72 that present corresponding front and rear beam ends 74,76 (see FIG. 3). The front section 70 includes a beam pivot shaft 78 (see FIG. 7). The front and rear sections 70,72 are connected at a detachable joint 80 with fasteners (see FIG. 7).

The disc walking beam 66 is preferably pivotally connected to the suspension arm 44 at a beam pivot joint 82 to permit pivoting of the beam about a lateral beam pivot axis A1 (see FIG. 3). In particular, the beam pivot shaft 78 is pivotally mounted in a journal (not shown) presented adjacent the lower arm end 50b to form the beam pivot joint 82.

The disc walking beam 66 is configured to pivot about the lateral pivot axis A1 between a range of positions. The rear section 72 presents a stop surface 84 (see FIGS. 7 and 10) that engages the suspension arm 44 in the transport position (see FIG. 3). However, the stop surface 84 could be alternatively positioned. The stop surface 84 engages the suspension arm 44 to restrict the front beam end 74 from pivoting downwardly when in such a transport position. The front beam end 74 tends to pivot downwardly in the transport position because a center of gravity CG1 for the combination of the walking beam assembly 46, furrow opening assembly 34, and the wheels 38,40 is located forwardly of the beam pivot axis A1 (see FIGS. 3 and 4). However, it will be appreciated that the center of gravity CG1 could be alternatively positioned relative to the beam pivot axis A1. It will be further appreciated that in some alternative positions, the stop surface 84 may not be required.

Preferably, the disc walking beam 66 is operable to distribute a force applied by the suspension arm 44 (such as the downward arm force F2 associated with the operating position) between the furrow opening assembly 34 and the firmer/closer walking beam 68. Although the illustrated disc walking beam 66 is preferred, the disc walking beam 66 could have an alternative configuration without departing from the scope of the present invention. Also, for some aspects of the present invention, the disc opener 20 could be devoid of the disc walking beam 66.

In the usual manner, the furrow opening assembly 34 is configured to open the furrow U and direct seed S into the furrow U. The furrow opening assembly 34 preferably includes a rotatable disc blade 86, an adjustable depth gauge wheel 88, an opener shaft 90, a blade scraper 92, a seed boot 94, and a depth adjustment mechanism 96 (see FIG. 3).

As is customary, the gauge wheel 88 is adjustable to control the depth at which the disc blade 86 cuts into the ground G. The opener shaft 90 is rotatably mounted to the front beam end 74 of the disc walking beam 66 and rotatably supports the disc blade 86 alongside the front beam end 74. The opener shaft 90 includes a wheel shaft section 90a (see FIG. 5) that is axially offset behind the axis of the disc blade 86. The wheel shaft section 90a rotatably receives the gauge wheel 88. Thus, the opener shaft 90 can be rotated to move the gauge wheel 88 up and down relative to the disc blade 86.

The adjustment mechanism 96 includes a rotatable cam 98 and a stop arm 100. The cam 98 is rotatably supported on the disc walking beam 66, while the stop arm 100 is fixed to the opener shaft 90. The stop arm 100 engages the cam 98 to restrict opener shaft rotation corresponding to upward movement of the gauge wheel 88 relative to the disc blade 86. That is, the adjustment mechanism 96 sets an upper limit of gauge wheel movement. The cam 98 is selectively positionable in various rotational orientations to change the upper limit of gauge wheel movement.

The seed boot 94 is configured to receive a flow of seed S (e.g., from an air cart) and to deposit the seed S into the furrow U. The seed boot 94 presents a passage 102 (see FIGS. 6 and 7) that extends from an upper boot inlet to a lower boot outlet. The seed boot 94 is mounted relative to the disc walking beam 66 and is positioned adjacent the disc blade 86. In the usual manner, the seed boot 94 receives a flow of seed S in the passage 102 and discharges the seed S from the boot outlet into the furrow U.

While not included in the illustrated embodiment, it will be appreciated that the disc opener 20 could also include an ammonia injector to inject anhydrous ammonia adjacent the seed S. The injector could be supported relative to the suspension arm 44 (e.g., where the injector is mounted on the disc walking beam 66. Features of a preferred ammonia injector are disclosed in U.S. Publication No. 2015/0144039, published May 28, 2015, entitled ANHYDROUS AMMONIA INJECTOR FOR DISK OPENER, which is hereby incorporated in its entirety by reference herein.

Although the disc opener 20 preferably includes the furrow opening assembly 34, the principles of the present invention are applicable where the disc opener 20 has an alternative furrow opening mechanism. For instance, an alternative disc opener could have an alternative disc blade, an alternative gauge wheel, an alternative opener shaft, an alternative depth adjustment mechanism, or a combination of such alternative features.

In the operating position, the illustrated disc walking beam 66 distributes the arm force F2 applied by the suspension arm 44 between the furrow opening assembly 34 and the firmer/closer walking beam 68. In particular, the disc walking beam 66 generally applies a downward disc force F3 (see FIG. 4) to the disc blade 86, a downward gauge wheel force F4 (see FIG. 5) to the gauge wheel 88, and a downward walking beam force F5 (see FIG. 4) to the walking beam 68. Generally, the arm force F2 is approximately the same as the sum of forces F3-F5.

Although the illustrated furrow opening assembly 34 is preferably supported by the disc walking beam 66 for movement relative to the suspension arm 44, the furrow opening assembly 34 could be alternatively supported. For instance, the furrow opening assembly 34 could be mounted to move directly with the suspension arm 44 (e.g., where the disc opener 20 is devoid of the disc walking beam 66).

Turning to FIGS. 6-10, the firmer/closer walking beam 68 is configured to support and position the firming and closing wheels 38,40 during operation of the disc opener 20. The walking beam 68 preferably comprises a unitary, elongated weldment that includes a body 104, a tab 106, and a stop 108 that are integrally connected with one another. The body 104 presents opposite front and rear beam ends 110,112. Between the ends 110,112, the body 104 also presents an opening (not shown) that provides a pivot attachment location 114.

The illustrated firming wheel 38 comprises a unitary, solid disc structure that is configured to roll along the furrow U. The firming wheel 38 preferably presents an outermost firming surface 115 (see FIGS. 6, 7, and 9) that extends endlessly about the firming wheel 38. The firming surface 115 preferably has a profile shape with a constant radius (see FIG. 6) to smoothly and gently press the seed S into the furrow U. However, the firming wheel 38 could be alternatively configured without departing from the scope of the present invention. For instance, the firming wheel 28 could have a hub-and-spoke construction attached to an endless outer margin that presents the firming surface 115. Also, the profile of an firming surface could present a width dimension (not shown) that is larger or smaller than the width dimension of firming surface 115.

The firming wheel 38 is preferably rotatably mounted to the walking beam 68 adjacent the front beam end 110 with a sleeve 116 and a fastener 118 (see FIGS. 6 and 7). The sleeve 116 spaces the firming wheel 38 laterally from the walking beam 68, and the fastener 118 extends through the firming wheel 38, sleeve 116, and walking beam 68. The firming wheel 38 rotates about a lateral firming wheel axis A2.

While the illustrated mounting construction is preferred to rotatably mount the firming wheel 38 on the walking beam 68, an alternative mounting structure could be used. For instance, the disc opener could include a sealed bearing assembly to rotatably mount the firming wheel 38 on the walking beam 68.

Although the disc opener 20 includes a single firming wheel 38, it is within the scope of the present invention where multiple firming wheels are used to press the seed S into the furrow U.

The illustrated closing wheel 40 comprises a unitary disc structure that includes a generally circular frame 119*a* and a plurality of tines 119*b* (see FIGS. 6, 7, and 9). Preferably, each tine 119*b* is fixed to and extends radially outwardly from the frame 119*a*. Each of the illustrated tines 119*b* extends outwardly at an acute angle relative to the radial direction to dig into the ground G and gently move soil L into the furrow U. However, the closing wheel 40 could be alternatively configured without departing from the scope of the present invention. For instance, the closing wheel could have tines that are alternatively shaped and/or positioned. Also, the closing wheel 40 could present an endless outermost disc margin to dig into the ground G (e.g., where the disc margin has a corrugated shape).

The closing wheel 40 is also preferably rotatably mounted to the walking beam 68. Specifically, the closing wheel 40 is mounted on the tab 106 adjacent the rear beam end 112 with a sleeve 120 and a fastener 122 (see FIGS. 6 and 7). The sleeve 120 spaces the closing wheel 40 laterally from the walking beam 68, and the fastener 122 extends through the closing wheel 40, sleeve 120, and the tab 106. The closing wheel 40 rotates about a lateral closing wheel axis A3 (see FIG. 6).

The illustrated mounting construction is preferred to rotatably mount the closing wheel 40 on the walking beam 68. However, an alternative mounting structure could be used to mount the closing wheel 40. For instance, the disc opener could include a sealed bearing assembly to rotatably mount the firming wheel 38 on the walking beam 68.

The disc opener 20 preferably includes a single closing wheel 40. However, it is within the scope of the present invention where multiple closing wheels are used to cover the furrow U with soil L (e.g., where two closing wheels are positioned on opposite sides of the furrow U).

The walking beam 68 is preferably pivotally connected to the disc walking beam 66 at a beam pivot joint 124 to permit pivoting of the walking beam 68 about a lateral beam pivot axis A4. In particular, a beam pivot sleeve 126 of the walking beam assembly 46 is located between the walking beams 66,68 and secured with a beam pivot fastener 128 that extends through the pivot attachment location 114 (see FIG. 7).

The walking beam 68 is configured to pivot about the lateral beam pivot axis A4 between a range of positions. The stop 108 presents a stop surface 108*a* that engages the rear beam end 76 of the disc walking beam 66 when the walking beam 68 is in a stop position (approximately the position of the walking beam 68 shown in FIG. 8). The stop surface 108*a* engages the disc walking beam 66 to restrict the front beam end 110 from pivoting downwardly when in such a stop position.

The stop 108 is preferably located rearwardly of the beam pivot axis A4. However, the stop 108 could be alternatively configured and/or positioned to limit rotation of the walking beam 68.

The walking beam 68 and wheels 38,40 cooperatively provide a firming/closing assembly 130 that is preferably balanced relative to the beam pivot axis A4. That is, in the illustrated embodiment, a center of gravity CG2 for this assembly 130 is located forwardly of the beam pivot axis A4 (see FIGS. 3 and 4). However, the center of gravity CG2 for the assembly 130 could be alternatively positioned relative to the beam pivot axis A4.

Preferably, the walking beam 68 is operable to distribute a force between the firming and closing wheels 38,40. For instance, in the operating position, the illustrated disc walking beam 66 distributes the walking beam force F5 applied by the rear beam section 72 between the wheels 38,40. In particular, the walking beam 68 generally applies a downward firming force F6 (see FIG. 4) to the firming wheel 38 and a downward closing force F7 (see FIG. 4) to the closing wheel 40. Generally, the walking beam force F5 is approximately the same as the sum of forces F6 and F7.

The lateral beam pivot axis A4 and the firming wheel axis A2 cooperatively define a firming wheel spacing dimension D1, measured parallel to the longitudinal axis of the body 104 (see FIG. 9). Similarly, the lateral beam pivot axis A4 and the closing wheel axis A3 cooperatively define a closing wheel spacing dimension D2, measured parallel to the axis of the body 104 (see FIG. 9).

During operation, it has been determined that the amount of downward closing force F7 applied to the closing wheel 40 is preferably greater than the amount of downward firming force F6 applied to the firming wheel 38. As a result, the closing wheel spacing dimension D2 is preferably less than the firming wheel spacing dimension D1. However, for some aspects of the present invention, the dimension D2 could be the same as, or greater than, the dimension D1.

Furthermore, a ratio (D2/D1) of the closing wheel spacing dimension D2 to the firming wheel spacing dimension D1 preferably ranges from about ⅓ to about ¼. However, the ratio could be outside this range without departing from the scope of the present invention.

The illustrated tab 106 preferably extends at an oblique angle relative to the body 104 of the walking beam 68. As a result, the closing wheel axis A3 and the beam pivot axis A4 preferably define an oblique closing wheel angle $\alpha$ therebetween, such that the closing wheel 40 has an angled orientation relative to the vertical direction (see FIG. 6). It will be understood that the closing wheel 40 is positioned in this angled orientation so that the closing wheel 40 can efficiently move loose fill soil L into the furrow U.

The closing wheel angle $\alpha$ preferably ranges from about fifteen degrees (15°) to about twenty-five degrees (25°). However, it is within the scope of the present invention where the closing wheel angle $\alpha$ falls outside of this range.

Again, the configuration of the walking beam 68 allows the walking beam 68 to distribute the walking beam force F5 applied by the disc walking beam 66 at the pivot joint 124. The force F5 is distributed between the firming and closing wheels 38,40.

As the disc opener 20 travels over undulating ground G, the walking beam 68 is configured to articulate so that the wheels 38,40 follow the ground G and remain in engagement with the ground G. For instance, the walking beam 68 and wheels 38,40 are configured to follow the ground G when advanced up an inclined ground surface (see FIG. 9) and when advanced down a declined ground surface (see FIG. 10).

As mentioned above, the configuration of the walking beam assembly 46 provides several advantages when the disc opener 20 is in the operating position. Importantly, the walking beam assembly 46 has been found to restrict overpacking of fill soil L above the seed S. In particular, when the disc opener 20 is in the operating position, the firmer/closer walking beam arrangement distributes downward force F5 applied at the pivot joint 124 between the wheels 38,40. It has also been found that the walking beam 68 also restricts the firming wheel 38 from experiencing bounce or chatter while traveling in the furrow U.

The walking beams 66,68 of the walking beam assembly 46 are preferably configured to distribute a force applied by the suspension arm 44 among the furrow opening assembly 34 and the wheels 38,40. For instance, during operation, the actuator 32 applies a generally downward force, with the corresponding downward arm force F2 being applied by the suspension arm 44 on the beam pivot joint 82. The disc opener 20 preferably has a single suspension arm 44 to apply the downward arm force F2, with the downward force F2 being distributed by the walking beams 66,68.

It has been found that the use of a single suspension arm 44 in combination with the walking beams 66,68 provides various advantages. For instance, the walking beam arrangement permits downward forces to be applied to the wheels 38,40, disc blade 86, and gauge wheel 88 using a single actuator 32.

As the disc opener 20 travels over undulating ground G, the walking beams 66,68 are configured to articulate so that the wheels 38,40, disc blade 86, and gauge wheel 88 follow the ground G and remain in engagement with the ground G.

The illustrated arrangement for supporting the walking beam 68 is preferred for various reasons. However, for some aspects of the present invention, the firmer/closer walking beam 68 could be alternatively mounted and supported relative to the toolbar 24. For instance, the walking beam 68 could be pivotally attached to structure other than the disc walking beam 66 (e.g., where the walking beam 68 is pivotally mounted directly to the suspension arm). In one example of such an alternative arrangement, the walking beam 68 could be pivotally mounted to the suspension arm 44 because the suspension 36 does not have a disc walking beam 66. It is believed that many benefits of the firmer/closer walking beam system can be realized if it is mounted to structure other than the disc walking beam 66.

It will also be appreciated that the firmer/closer walking beam 68 and the furrow opening assembly 34 could be supported to move independently of one another (e.g., where each is supported by a corresponding suspension component, and the suspension components are shiftable independently of each other). For instance, in one alternative embodiment, the walking beam 68 could be supported by a first suspension arm and a first linkage while the furrow opening assembly 34 is supported by a second suspension arm and a second linkage.

In operation, the disc opener 20 can be selectively lowered from the transport position to the operating position to begin planting seed S. The disc opener 20 is lowered by extending the actuator 32 so that the furrow opening assembly 34 and the wheels 38,40 are brought into engagement with the ground G.

When using the disc opener 20 in the operating position, the actuator 32 is preferably pressurized with hydraulic fluid so that the downward force F2 on the disc walking beam 66 is applied and maintained by the suspension arm 44. As a result, corresponding downward forces F3, F4, F6, and F7 are distributed by the walking beams 66,68 to the disc blade 86, gauge wheel 88, and wheels 38,40 during operation. As the disc opener 20 travels over undulating ground G, the walking beams 66,68 are configured to articulate so that the wheels 38,40, disc blade 86, and gauge wheel 88 follow the ground G and remain in engagement with the ground G.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural disc opener operable to be advanced in a forward direction along the ground to plant seed, said agricultural disc opener comprising:
    a vertically adjustable suspension;
    a disc blade operably supported by the suspension to open an elongated furrow in the ground as the disc opener is advanced in the forward direction, with seed being deposited into the open furrow;
    a seed firming wheel located rearwardly of the disc blade and configured to press the seed downwardly into the furrow; and
    a closing wheel located rearwardly of the seed firming wheel and configured to deposit soil into the furrow to at least partly cover the seed,
    said suspension further including an elongated firmer/closer walking beam pivotally mounted relative to the suspension for pivoting about a lateral beam pivot axis,
    said wheels being rotatably mounted on the walking beam on opposite forward and aft sides of the beam pivot axis, with the walking beam configured to pivot as the wheels travel over the ground.

2. An agricultural disc opener as claimed in claim 1,
    said closing wheel being rotatably mounted on the walking beam to rotate about a lateral closing wheel axis,
    said closing wheel axis and said beam pivot axis cooperatively defining an oblique closing wheel angle therebetween.

3. An agricultural disc opener as claimed in claim 2,
    said closing wheel angle ranging from 15 degrees to 25 degrees.

4. An agricultural disc opener as claimed in claim 1,
    said firming wheel and said closing wheel defining, respectively, a firming wheel axis and a closing wheel axis about which the corresponding wheels rotate,
    said beam pivot axis and said firming wheel axis cooperatively defining a firming wheel spacing dimension,
    said beam pivot axis and said closing wheel axis cooperatively defining a closing wheel spacing dimension,
    said closing wheel spacing dimension being less than the firming wheel spacing dimension.

5. An agricultural disc opener as claimed in claim 4,
    said disc opener having a ratio of closing wheel spacing dimension to firming wheel spacing dimension that ranges from about ⅓ to about ¼.

6. An agricultural disc opener as claimed in claim 4,
    said firmer/closer walking beam and said firming and closing wheels cooperatively forming an assembly with a center of gravity that is located forwardly of the beam pivot axis.

7. An agricultural disc opener as claimed in claim 1,
    said firmer/closer walking beam including a stop to limit pivoting of the walking beam relative to the suspension.

8. An agricultural disc opener as claimed in claim 1,
    said firmer/closer walking beam and said firming and closing wheels cooperatively forming an assembly with a center of gravity that is located forwardly of the beam pivot axis.

9. An agricultural disc opener as claimed in claim 1,
    said suspension including a vertically shiftable suspension element operable to be selectively spaced above the ground,
    said firmer/closer walking beam being pivotally mounted relative to the shiftable suspension element at a pivot joint; and
    a disc walking beam mounted relative to the shiftable suspension element at a second pivot joint and pivotal relative to the shiftable suspension element about a second lateral beam pivot axis.

10. An agricultural disc opener as claimed in claim 9,
    said disc blade being rotatably mounted on the disc walking beam on a forward side of the second lateral beam pivot axis, with the disc walking beam configured to pivot as the disc blade travels over the ground.

11. An agricultural disc opener as claimed in claim 9,
    said firmer/closer walking beam being pivotally mounted on an aft side of the second lateral beam pivot axis, with both walking beams configured to pivot as the disc opener advances over the ground.

12. An agricultural disc opener as claimed in claim 11,
    at least one of said disc walking beam and said firmer/closer walking beam including a stop to limit pivoting of the walking beams relative to one another.

13. An agricultural disc opener as claimed in claim 12,
    said firmer/closer walking beam including the stop, with the stop engaging the disc walking beam when the walking beams are in a stop position to limit relative pivoting movement between the walking beams.

14. An agricultural disc opener as claimed in claim 12,
    said shiftable suspension element comprising a single suspension arm pivotally attached to the disc walking beam, with the walking beams being shiftable by up and down movement of the suspension arm.

15. An agricultural disc opener as claimed in claim 14, further comprising:
    a mounting bracket operable to be attached to a toolbar, with the suspension arm being shiftable up and down relative to the mounting bracket; and
    an actuator that drivingly interconnects the mounting bracket and the suspension arm to drive the suspension arm up and down relative to the mounting bracket and cause corresponding movement of the walking beams.

16. An agricultural disc opener as claimed in claim 14, further comprising:
    a mounting bracket operable to be attached to a toolbar,
    said suspension including a four-bar linkage shiftably interconnecting the mounting bracket and the suspension arm, with the linkage pivoting as the suspension arm shifts up and down relative to the mounting bracket.

17. An agricultural disc opener as claimed in claim 16, further comprising:
    an actuator that drivingly interconnects the mounting bracket and the suspension arm to drive the suspension arm up and down relative to the mounting bracket.

18. An agricultural disc opener as claimed in claim 1,
    said suspension including a vertically shiftable suspension element operable to be selectively spaced above the ground, said firmer/closer walking beam being pivotally mounted relative to the shiftable suspension element at a pivot joint, said shiftable suspension element comprising a single suspension arm that supports the firmer/closer walking beam, with the walking beam being shiftable by up and down movement of the suspension arm.

19. An agricultural disc opener as claimed in claim 18, further comprising:

a mounting bracket operable to be attached to a toolbar, with the shiftable suspension element being shiftable up and down relative to the mounting bracket; and an actuator that drivingly interconnects the mounting bracket and the suspension arm to drive the suspension arm up and down relative to the mounting bracket.

20. An agricultural disc opener as claimed in claim 18, further comprising:

a mounting bracket operable to be attached to a toolbar, said suspension including a four-bar linkage shiftably interconnecting the mounting bracket and the suspension arm, with the linkage pivoting as the suspension arm shifts up and down relative to the mounting bracket.

* * * * *